United States Patent Office 3,344,391
Patented Sept. 26, 1967

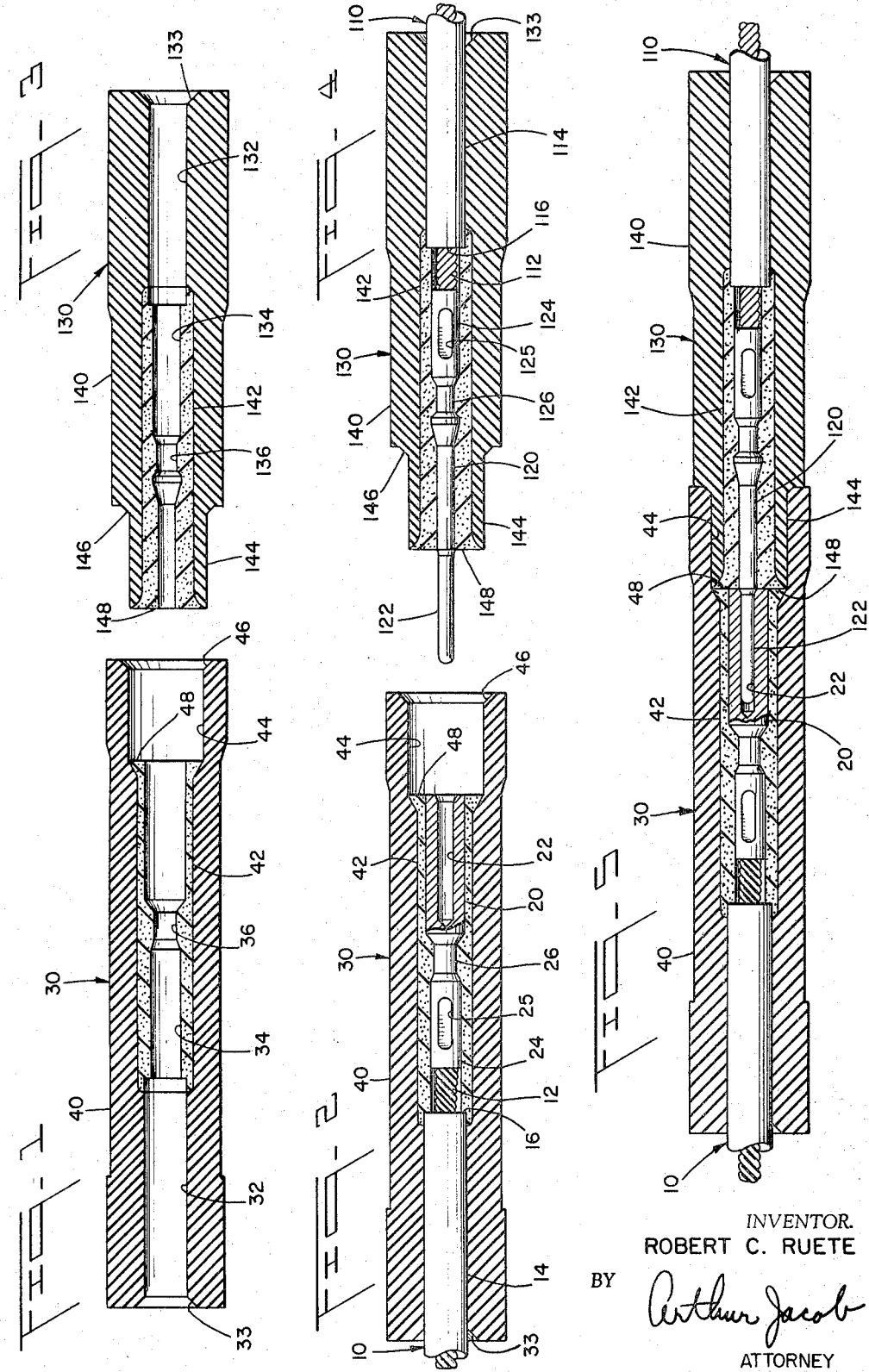

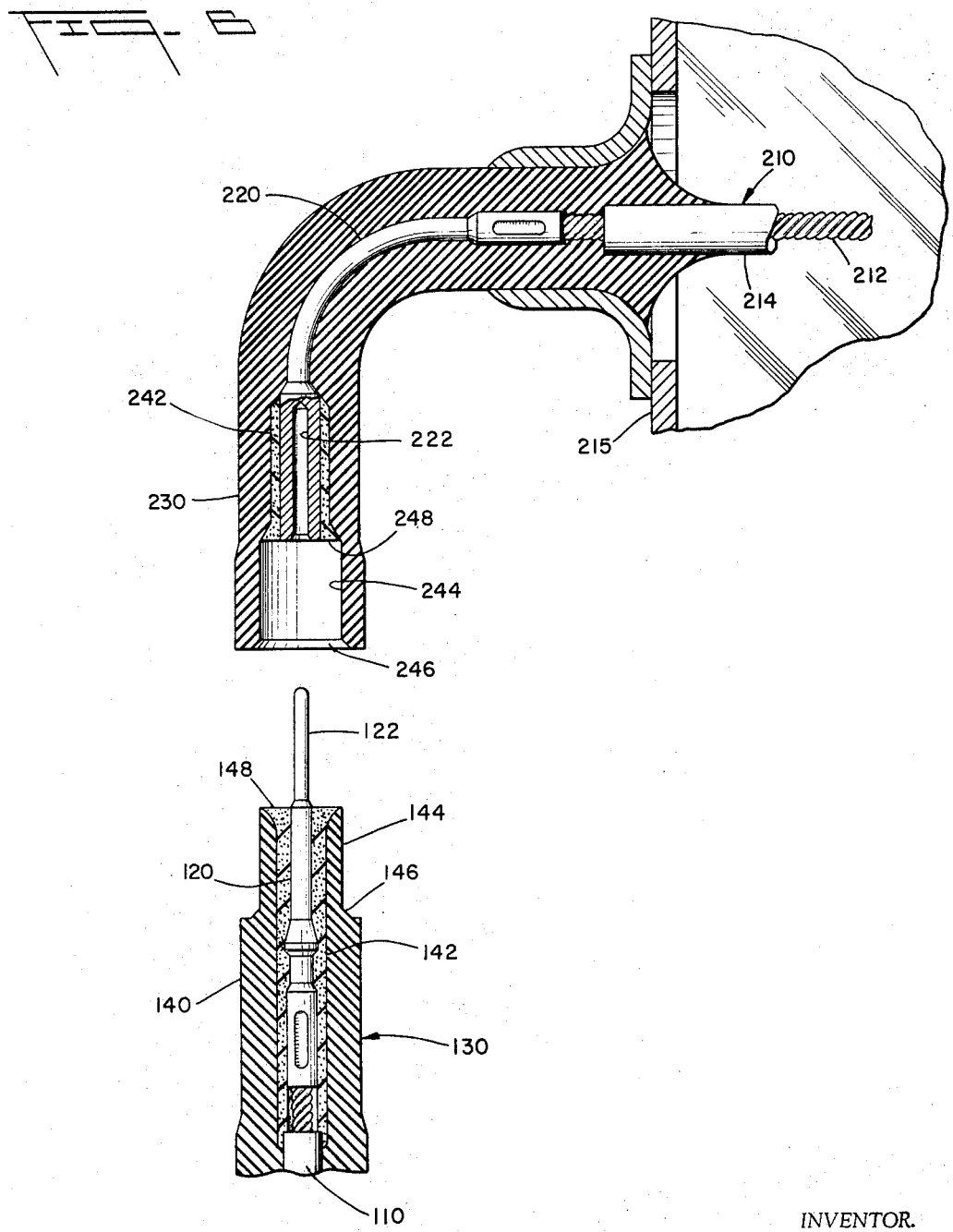

3,344,391
WATERPROOF ELECTRICAL CONNECTIONS
Robert C. Ruete, Long Valley, N.J., assignor to Elastic Stop Nut Corporation of America, Union, N.J., a corporation of New Jersey
Continuation of abandoned application Ser. No. 345,008, Feb. 14, 1964. This application Oct. 25, 1966, Ser. No. 589,464
9 Claims. (Cl. 339—60)

ABSTRACT OF THE DISCLOSURE

In a waterproof electrical connector element capable of being assembled in the field at the terminus of a high voltage cable, the cable having an electrical conductor and a covering of insulating material with a portion of the insulating material removed to establish a terminus thereof and expose the conductor and the connector element having an electrical contact which can be electrically connected and mechanically secured to the exposed conductor, a unitary housing of resilient material surrounding at least a portion of the contact, the exposed conductor and the covering, the housing including an outer sleeve-like member of resilient insulating elastomeric material and an inner sleeve-like member of resilient electrically conductive elastomeric material disposed between the outer member and the contact and exposed conductor and electrically connected with the contact such that the voltage gradient between the contact and the inner member is reduced to a minimum thus reducing the tendency for corona to be established as a result of air trapped within the connector element and thereby eliminating the deleterious effects of such corona. A portion of the inner member of electrically conductive elastomeric material overlaps with a corresponding portion of the covering of the cable so as to preclude the establishment of corona at the terminus of the covering of insulating material. The inner member of electrically conductive elastomeric material may include a surface extending radially adjacent a portion of the end of the housing which will cooperate with a complementary connector element so as to reduce to a minimum the voltage gradient along corresponding radially extending surfaces of engaged complementary connector elements from the contacts of such connector elements radially outwardly to interfitted axially extending complementary surfaces thereof.

This application is a continuation of application Serial No. 345,008, filed February 14, 1964, and now abandoned.

The present invention relates generally to electrical connectors and electrical connections and more specifically pertains to improvements in electrical connectors which have component parts capable of being assembled in the field at the terminus of high voltage cables to effect a waterproof electrical connection between such cables.

Where the use of electrical cables requires that the cables be exposed to adverse elements by being placed on the surface of the ground, directly buried in the ground or immersed in water, electrical connectors have been devised for providing electrical joints or connections which may be readily fabricated in the field and may be used with safety in such installations. These connectors are supplied in individual component parts capable of assembly in the field and have proved to be highly desirable in providing good electrical connections which exhibit the necessary resistance to adverse elements. However, in employing such connectors in effecting connections between high voltage cables, it has been found that practical manufacturing tolerances in the component parts have allowed air to be trapped between the assembled parts with the result that at the operating voltages of the cables and connections, the trapped air breaks down to allow the establishment of corona within the connectors and connections with consequent deleterious effects. Such undesirable effects include energy losses in the form of radio noise, excessive heat and the formation of corrosive elements within the connectors and at the connections and give rise to both chemical and physical attack upon the connector materials.

I have found that connectors and connections of the type described above can be made to exhibit improved performance at high voltage levels by an arrangement of structural components which tends to eliminate electrical stress upon air which is inevitably trapped within such assemblies and hence reduces to a minimum the deleterious effects which could otherwise arise with the establishment of corona in these devices.

It is therefore an important object of the invention to provide an arrangement of structural components in assembled electrical connectors and connections which will attain improved performance of such assemblies at high voltages.

Another object of the invention is to provide means by which the electrical stresses within assembled electrical connectors and connections of the type described can be controlled so as to increase the reliability and performance of such connectors and connections.

Still another object of the invention is to provide electrical connectors which may be conveniently applied in the field at the terminus of high voltage cables, the use of which connectors will result in an effective electrical connection affording safety in installations on the surface of the ground, directly buried in the ground or immersed in water.

A further object of the invention is to provide electrical connectors comprised of component parts capable of being readily assembled in the field to enable fabrication of efficient, readily disconnectable electrical connections at any desired location in a high voltage cable.

A still further object of the invention is to provide electrical connectors for high voltage cables which are economical to manufacture, easy to apply and reliable in use.

The invention may be described briefly as providing a housing of resilient material in a waterproof electrical connector element for use at the terminus of a high voltage cable, the cable having an electrical conductor and a cover of insulating material with a portion of the insulating material being removed to expose the conductor and an electrical contact electrically connected to the exposed conductor, the housing of resilient material surrounding at least a portion of the contact, the exposed conductor and the covering, and including an outer layer of resilient insulating material having a portion cooperating with a corresponding portion of the covering in watertight relationship therewith, and an inner layer of resilient electrically conductive material disposed between the outer layer and the contact and exposed conductor contiguous with the outer layer and electrically connected with the contact such that the voltage gradient between the contact and the inner layer is reduced to a minimum.

The novel features of the invention, as well as additional objects and advantages thereof, will be more fully understood from the following description of specific embodiments of the invention illustrated in the accompanying drawings in which:

FIGURE 1 is a sectional view of a housing constructed in accordance with the invention;

FIGURE 2 is a sectional view of an electrical connector element of the invention;

FIGURE 3 is a sectional view of a housing constructed in accordance with the invention to complement the housing of FIGURE 1;

FIGURE 4 is a sectional view of an electrical connector element of the invention constructed to complement the connector element of FIGURE 3;

FIGURE 5 is a sectional view of a detachable electrical connection constructed in accordance with the invention; and FIGURE 6 is a sectional view of an electrical connector with one complementary element being formed as an integral part of a transformer housing.

Referring now to the drawings, and more particularly to FIGURES 1 and 2, an electrical connector element constructed in accordance with the invention is shown applied at the terminus of a first high voltage cable 10 in FIGURE 2, the cable having an electrical conductor 12, which may be solid or stranded, and an insulating covering 14. The covering is skived so as to terminate at 16 and expose a predetermined length of conductor 12 which in turn is electrically connected to an electrical contact 20 which is provided with a socket 22 and a ferrule 24 which receives the exposed length of conductor 12, the conductor being mechanically secured to the contact 20 as by crimping the ferrule 24 at 25 in a well known manner. A grooved portion 26 lies between the sockets 22 and the ferrule 24 for purposes which will be pointed out below.

In order to attain the objective of providing a connector which may be employed safely in locations exposed to the elements as foresaid, a member illustrated in the form of a generally cylindrical continuous housing 30 (FIGURE 1) is fitted over the cable 10, in a manner best illustrated in FIGURE 2, to protectively encase and seal the electrical connection at ferrule 24 against the action of such elements. The housing is preferably molded of a resilient material as will be more fully explained hereinafter. A passage 32 is provided in housing 30 for cable 10, the relative normal diameters of the passage 32 and a corresponding portion of the covering 14 of the cable 10 being such that the latter may be passed through the former by hand in an interference or frictional fit which will provide what may be called "waterseal" along their mating surfaces to prevent water from entering the connector element and approaching the electrical connections between the conductor 12 and the contact 20 through the passage 32. Such hand insertion of the cable 10 into the housing 30 is facilitated by the provision of a chamfer 33 at the entrance to the passage 32.

Housing 30 has an internal cylindrical surface 34 complementary to the external surface of the contact 20 and provided with a relatively smaller diameter portion 36. The relative normal diameters of the internal cylindrical surface 34 and the external surface of the contact 20 are such that the latter may be inserted into the former by hand, the resilient property of the housing 30 permitting radial expansion to dilate surface 34 and admit the contact 20. Upon insertion of the contact 20 into the housing 30, smaller diameter portion 36 will cooperate with grooved portion 26 of the contact to mechanically secure the contact firmly in place within the housing in the assembled electrical connector as seen in FIGURE 2.

In attaching a connector element of the invention to the terminus of a cable, the exposed end of the conductor is inserted into the ferrule of a contact and the contact is mechanically secured and electrically connected to the conductor by crimping the ferrule, as best seen at 25 in FIGURE 2. The contact and the attached cable can then be inserted into the housing. When portion 36 becomes seated in groove 26 the assembly is complete and the housing provides a watertight insulated connector which may readily be installed in the field at the terminus of cable 10.

Practical limitations are imposed upon the relative dimensions of internal surface 34 and the external surface of contact 20 by manufacturing tolerances as well as by the necessity of retaining ease of assembly of the housing and the contact by hand. Such limitations give rise to the existence of trapped air in various locations along the contact 20 and the electrical conductor 14 between the contact and conductor and the housing. It has been found that where a sufficiently high voltage is carried by the conductor and contact, such trapped air can be stressed to the point of breakdown with the consequent establishment of corona at these locations within the connector. As explained hereinabove, the existence of corona within the connector will have deleterious effects.

Various methods have been proposed to exclude trapped air from within connectors of the type with which the invention is concerned. However, the instant invention recognizes that in assembling such connectors in the field some air can inevitably be trapped within the assembled connector. Thus, the invention proposes to control the electrical stress placed upon such trapped air so as to tend to eliminate the formation of corona and the concomitant deleterious effects.

In order to achieve such an end, housing 30 is constructed with an outer layer 40 of resilient insulating material and an inner layer 42 of resilient electrically conductive material contiguous therewith, each layer 40 and 42 being constructed in the form of a sleeve-like member (see FIGURE 1). The layers are contiguous and the juncture between the inner and outer layers is void-free. When the housing 30 is assembled with the cable 10 and contact 20 to establish the connector element shown in FIGURE 2, the inner layer 42 is positioned between the outer layer 40 and the contact 20 and exposed conductor 12 and is electrically connected with the contact 20 by virtue of the physical contact between the inner layer and the contact 20. Hence, the electrical potential of the inner layer 42, which is electrically conductive, is raised to essentially the same voltage as is carried by the conductor 12 and contact 20 and the voltage gradient between the inner layer and the conductor and contact is reduced to a minimum. Since any air trapped within the connector during assembly will lie between the inner layer 42 and the contact 20 or conductor 12, where the voltage gradient is reduced to a minimum, the electrical stress placed upon the air is so reduced as to prevent the establishment of corona within the assembled connector. Thus, by surrounding the trapped air which inevitably appears within assembled connectors of the type illustrated with an essentially equal electrical potential, electrical stress of the air is controlled and the problem of corona is eliminated.

Both the outer layer 40 and the inner layer 42 are preferably fabricated of an elastomeric material, the outer layer being an electrically insulating elastomer while the inner layer is an electrically conductive elastomer. In practice the inner layer is preferably molded first in the form of a sleeve. Then the outer layer is molded around the inner layer to form a composite housing having continuous sleeve-like members or layers joined in a unitary assembly, the juncture between the sleeve-like layers being continuous and void-free to eliminate air from between the conducting and insulating portions of the housing and enable the electrical stresses to be kept within control along the length of the juncture. By employing compatible molding materials, an actual physical bonding may be attained between the contiguous sleeve-like layers. While a variety of available elastomers are suitable, one material which has been successfully employed, both in insulating and conducting forms, is a newly developed ethylene-propylene terpolymer commercially available under the name "Nordel."

As pointed out hereinabove, housing 30 is provided with a passage 32 at one end thereof, the passage 32 being routed through the outer layer 40 of insulating material and being resiliently dilatable to admit a corresponding portion of the covering 14 of cable 10 and cooperate with the cable in water-tight relationship therewith. Adjacent the opposite end of the outer layer 40 is a generally cylindrical, resiliently dilatable internal surface 44, chamfered at 46, and inner layer 42 is made to extend radially outwardly adjacent the opposite end at flanged portion 48 to meet surface 44 for purposes which will be explained shortly.

Turning now to FIGURES 3 and 4, an electrical connector element constructed in accordance with the invention and complementary to that illustrated in FIGURES 1 and 2 is shown attached at the terminus of a second cable 110 in FIGURE 2 which, like cable 10, is comprised of an electrical conductor 112 and an insulating covering 114, the covering being terminated at 116 to expose a length of conductor 112. As explained in conjunction with the connector element of FIGURES 1 and 2, an electrical contact 120 is connected to the conductor, the contact 120 being provided with a plug 122 (which is separably engagable with socket 22), a ferrule 124 crimped at 125 and a grooved portion 126.

As in housing 30, housing 130 has a resiliently dilatable passage 132 for receiving a corresponding portion of covering 114 of cable 110 in watertight relationship therewith, passage 132 being chamfered at 133. Internal cylindrical surface 134, with portion 136, is provided to locate and secure the contact 120 within the housing 130 as explained hereinbefore in conjunction with the connector elements of FIGURES 1 and 2. Housing 130 is constructed with an outer sleeve-like member or layer 140 of resilient insulating material and an inner sleeve-like member or layer 142 of resilient electrically conductive material contiguous therewith (see FIGURE 3), for the purposes explained hereinbefore. Adjacent the end of the outer layer 140 opposite to the chamfered entrance to passage 132 is a generally cylindrical external surface 144 complementary to corresponding internal surface 44 and a beveled shoulder 146 corresponding to chamfer 46. Inner layer 142 is made to extend radially outwardly adjacent this opposite end at flanged portion 148 to meet surface 144 for purposes which will now be explained.

A detachable electrical connection between high voltage cables 10 and 110 may be effected readily in the field by the asembly of the connector elements illustrated in FIGURES 2 and 4, respectively, as explained hereinbefore, and then interfitting the connector elements to form the connection shown in FIGURE 5. The electrical connection between conductors 12 and 112 is completed by virtue of plug 122 being received in socket 22 when the respective housings are grasped and the contacts pushed together into separable engagement. The relative diameters of surfaces 44 and 144 are such that an interference fit is established therebetween to provide a water-seal along these overlapping mating surfaces for protectively encasing the electrical connection between the contacts 20 and 120 within the interfitted housings. The insertion of male surface 144 into female surface 44 is facilitated by chamfer 46, and after insertion shoulder 146 cooperates with chamfer 46 to assure that no voids are present along these overlapping mating surfaces. The connection may be detached readily by merely grasping the housings and pulling the connection apart.

When the connector elements are interfitted to establish the connection of FIGURE 5 air will tend to be excluded from between the overlapping surfaces 44 and 144 as a result of the relatively tight fit, but air will tend to be trapped within the connection between the abutting surfaces of the ends of the connector elements at flanged portions 48 and 148. Ordinarily such trapped air could give rise to problems due to corona formation since the trapped air would lie between the surfaces of connected contacts 20 and 120 and the insulating material of surface 44 and would thus be electrically stressed by the voltage gradient between these surfaces. However, by extending inner layers 42 and 142 radially outwardly at flanged portions 48 and 148 to intersect surfaces 44 and 144, respectively, the voltage along the abutting surfaces between the surfaces of contacts 20 and 120 and overlapping surfaces 44 and 144 is maintained essentially constant and the voltage gradient is reduced to a minimum. The electrical stress upon the trapped air within the connection is thereby controlled so as to protect against the establishment of corona within the connection and the concomitant deleterious effects.

For purposes of illustration both the male and the female connector elements of the connection shown in FIGURE 5 have been depicted as being assembled of a series of component parts; however, it will be apparent to those skilled in the art that either a male or a female connector element having the construction shown may be separably joined to a connector element having a complementary configuration, but having been integrally fixed to a cable or other structure at the factory. Thus, the invention provides male and female connector elements, either of which may be applied in the field at any desired location in a high voltage cable to mate with any complementary connector element, or both of which may be applied in the field to enable, in either case, the fabrication of an efficient, readily disconnectable electrical connection at any desired location in a high voltage cable.

An example of such an application is illustrated in FIGURE 6 wherein a connecter of the type illustrated in FIGURE 4 has been assembled at the end of a high voltage cable in the field in order to enable the cable to be attached to a transformer lead 210, which has an electrical conductor 212 with an insulating cover 214, a complementary connector having been formed integral with the transformer housing 215. The complementary connector has been formed with an electrical contact 220 fixed to the conductor 212 and having a socket 222 for receiving the complementary plug 122 of the assembled connector. A housing 230 includes an outer layer 240 of resilient insulating material and an inner layer 242 of resilient electrically conductive material. The outer layer 240 is provided with an internal female surface portion 244 chamfered at 246 for receiving complementary male surface 144 to form a watertight seal and electrical connections in a manner described above in conjunction with FIGURE 5. As in the connector elements described above, each layer 240 and 242 is fabricated in the form of a sleeve-like member of elastomeric material; however, since housing 230 is fabricated in the factory, the housing may be molded around contact 220 to establish the assembled integral connector element, hence the material of the outer layer can be made to fill all the voids between the contact 220 and the contiguous housing 230 and it is unnecessary to provide an inner layer of resilient conductive material along the entire length of the contact. Inner layer 242 is thus provided only along the socket 222 where there is a possibility of obtaining air between the socket and the housing by virtue of the slight expansion and contraction of the socket by insertion and removal of the corresponding plug 122 and surface 144. In addition, inner layer 242 extends radially outwardly at flanged portion 248 to intersect surface 244 so that when the connector elements of FIGURE 6 are interfitted to establish an electrical connection therebetween flanged portion 248 will match flanged portion 148 of the complementary connector element so as to reduce to a minimum the voltage gradient along the abutting surfaces between the surfaces of contacts 120 and 220 and overlapping surfaces 144 and 244 and thus control the electrical stress upon any air trapped within the connection between flanged portions 148 and 248 as explained hereinbefore. Thus, when the housing 130 is assembled with housing 230 the high voltage cable 110 is detachably connected to the transformer lead 210 in a simple and effective manner.

While the described embodiments illustrate the application of the invention to connectors for use with ordinary insulated cables, it will be apparent that the invention is well suited to connectors of the type used with high voltage shielded cables wherein a well defined high voltage gradient exists between the conductor and the shield of the connector element.

It is to be understood that the above detailed description of preferred embodiments of the invention is provided by way of example only and is not intended to restrict the invention. Various details of design and construction may be modified without departing from the true spirit and scope of the invention as defined in the appended claims.

The embodiments of this invention in which an exclusive property or privilege is claimed are defined as follows:

1. A waterproof electrical connector element capable of being assembled in the field at the terminus of a high voltage cable, the cable having an electrical conductor and a covering of insulating material with a portion of the insulating material removed to establish a terminus thereof and expose the conductor, said connector element comprising:

an electrical contact electrically connected and mechanically secured to the exposed conductor; and a unitary housing of resilient material surrounding at least a portion of the contact, the exposed conductor and the covering, the housing including, an outer sleeve-like member of resilient insulating elastomeric material having a given length with an axially extending opening therein and including a resiliently dilatable portion adjacent one end thereof, which dilatable portion in an undilated condition has an internal diameter less than the external diameter of a corresponding portion of the covering received within the opening, said dilatable portion being dilated and overlapping with said corresponding portion in watertight relationship therewith, and an inner sleeve-like member of resilient electrically conductive elastomeric material disposed between the outer member and the contact and exposed conductor, said inner member having an axial length less than the length of the outer member and being joined with the outer member to surround at least a portion of the contact and the exposed conductor, said inner member terminating at one end displaced axially from said one end of the outer member and including an axially extending opening aligned with the opening in the outer member and having a first portion cooperating with the contact and including an inside diameter complementing a corresponding outside diameter of the contact portion with the inner member electrically connected with the contact such that the voltage gradient between the contact and the inner member is reduced to a minimum, and a second portion extending axially along the opening in the inner member from said one end of the inner member toward the first portion thereof, said second portion being contiguous with the resiliently dilatable portion of the outer member and being resiliently dilatable, said second portion having an internal diameter equal to the internal diameter of the resiliently dilatable portion of the outer member when both said dilatable portions are undilated and being dilated and overlapping with a corresponding portion of the covering received within the opening in the inner member to extend the inner member along the covering beyond the terminus of the covering.

2. The waterproof electrical connector element of claim 1 wherein:

said housing includes an axially extending generally cylindrical portion adjacent the opposite end of the housing, complementary to a corresponding portion of a complementary connector element and establishing an axially extending cylindrical surface for receiving and engaging a complementary cylindrical surface of an engaged complementary connector element, said inner member includes a surface extending radially adjacent a portion of the opposite end of the housing from the contact to said cylindrical surface so as to reduce to a minimum the voltage gradient along corresponding radially extending surfaces of engaged complementary connector elements from the contacts of such connector elements to the engaged cylindrical surfaces thereof.

3. A waterproof electrical connector element capable of being assembled in the field at the terminus of a high voltage cable, the cable having an electrical conductor and a covering of insulating material with a portion of the insulating material removed to establish a terminus thereof and expose the conductor, said connector element comprising:

an electrical contact electrically connected and mechanically secured to the exposed conductor; and a unitary housing of resilient material surrounding at least a portion of the contact, the exposed conductor and the covering, the housing including, an outer sleeve-like member of resilient insulating elastomeric material having a given length with an axially extending opening therein and including a resiliently dilatable portion adjacent one end thereof, which dilatable portion in an undilated condition has an internal diameter less than the external diameter of a corresponding portion of the covering received within the opening, said dilatable portion being dilated and overlapping with said corresponding portion in watertight relationship therewith, an inner sleeve-like member of resilient electrically conductive elastomeric material disposed between the outer member and the contact, said inner member having an axial length less than the length of the outer member and being joined with the outer member to surround at least a portion of the contact, said inner member terminating at one end displaced axially from said one end of the outer member and including an axially extending opening aligned with the opening in the outer member and having a first portion cooperating with the contact and including an inside diameter complementing a corresponding outside diameter of the contact portion with the inner member electrically connected with the contact such that the voltage gradient between the contact and the inner member is reduced to a minimum, and an axially extending generally cylindrical portion adjacent the opposite end of the housing, complementary to a corresponding portion of a complementary connector element and establishing an axially extending cylindrical surface for receiving and engaging a complementary cylindrical surface of an engaged complementary connector element, said inner member having a surface extending radially adjacent a portion of the opposite end of the housing from the contact to said cylindrical surface so as to reduce to a minimum the voltage gradient along corresponding radially extending surfaces of engaged complementary connector elements from the contacts of such connector elements to the engaged cylindrical surfaces thereof.

4. A detachable waterproof electrical connection capable of being assembled in the field at the terminus of high voltage cables for providing a detachable electrical connection between first and second such cables, each cable having an electrical conductor and a covering of insulating material with a portion of the covering of each cable removed to establish a terminus thereof and expose the conductor, said connection comprising:

first and second electrical contacts, each electrically connected and mechanically secured to one conductor and in detachable electrical connection with one another;

first and second unitary housings of resilient material surrounding, respectively, at least a portion of the first and second contacts, the exposed conductors and the coverings, each housing including, an outer sleeve-like member of resilient insulating elastomeric material having a given length with an axially extending opening therein and including a resiliently dilatable portion adjacent one end thereof, which dilatable portion in an undilated condition has an internal diameter less than the external diameter of a corresponding portion of the covering received within the opening, said dilatable portion being dilated and overlapping with said corresponding portion in watertight relationship therewith, and an inner sleeve-like member of resilient electrically conductive elastomeric material disposed between the outer member and the contact, said inner member having an axial length less than the length of the outer member and being joined with the outer member to surround at least a portion of the contact, said inner member terminating at one end displaced axially from said one end of the outer member and including an axially extending opening aligned with the opening in the outer member and having a first portion cooperating with the contact and including an inside diameter complementing a corresponding outside diameter of the contact portion with the inner member electrically connected with the contact such that the voltage gradient between the contact and the inner member is reduced to a minimum;

the first and second housings being detachably joined together with the first housing having an axially extending generally cylindrical external portion adjacent the opposite end thereof and the second housing having a corresponding generally cylindrical resiliently dilatable internal portion adjacent the opposite end thereof, which dilatable portion in an undilated condition has an internal diameter less than the external diameter of the external portion, said dilatable portion being dilated and overlapping with the external portion in watertight relationship therewith to establish a waterseal for protectively encasing said connection within the joined housings, and the inner members of the first and second housings having corresponding surfaces extending radially adjacent portions of the opposite ends of the housings from the contacts to said external and internal portions, respectively, so as to reduce to a minimum the voltage gradient along said corresponding surfaces from the connected contacts to the waterseal.

5. The detachable waterproof electrical connection of claim 4 wherein each inner member has a second portion extending axially along the opening therein from said one end of the inner member toward the first portion thereof, said second portion being contiguous with the resiliently dilatable portion of the outer member and being resiliently dilatable, said second portion having an internal diameter equal to the internal diameter of the resiliently dilatable portion of the outer member when both said dilatable portions are undilated and being dilated and overlapping with a corresponding portion of the covering received within the opening in the inner member to extend the inner member along the covering beyond the terminus of the covering.

6. A detachable waterproof electrical connection capable of being assembled in the field at the terminus of high voltage cables for providing a detachable electrical connection between first and second such cables, each cable having an electrical conductor and a covering of insulating material with a portion of the covering of each cable removed to establish a terminus thereof and expose the conductor, said connection comprising:

first and second electrical contacts, each electrically connected and mechanically secured to one conductor and in detachable electrical connection with one another;

first and second unitary housings of resilient material surrounding, respectively, at least a portion of the first and second contacts, the exposed conductors and the coverings, each housing including, an outer sleeve-like member of resilient insulating elastomeric material having a given length with an axially extending opening therein and including a resiliently dilatable portion adjacent one end thereof, which dilatable portion in an undilated condition has an internal diameter less than the external diameter of a corresponding portion of the covering received wthin the opening, said dilatable portion being dilated and overlapping with said corresponding portion in watertight relationship therewith, and an inner sleeve-like member of resilient electrically conductive elastomeric material disposed between the outer member and the contact and exposed conductor, said inner member having an axial length less than the length of the outer member and being joined with the outer member to surround at least a portion of the contact and the exposed conductor, said inner member terminating at one end displaced axially from said one end of the outer member and including an axially extending opening aligned with the opening in the outer member and having a first portion cooperating with the contact and including an inside diameter complementing a corresponding outside diameter of the contact portion with the inner member electrically connected with the contact such that the voltage gradient between the contact and the inner member is reduced to a minimum;

the first and second housings being detachably joined together with the first housing having an axially extending generally cylindrical external portion adjacent the opposite end thereof and the second housing having a corresponding generally cylindrical resiliently dilatable internal portion adjacent the opposite end thereof, which dilatable portion in an undilated condition has an internal diameter less than the external diameter of the external portion, said dilatable portion being dilated and overlapping with the external portion in watertight relationship therewith to establish a waterseal for protectively encasing said connection within the joined housings, and each inner member having a second portion extending axially along the opening therein from said one end of the inner member toward the first portion thereof, said second portion being contiguous with the resiliently dilatable portion of the outer member and being resiliently dilatable, said second portion having an internal diameter equal to the internal diameter of the resiliently dilatable portion of the outer member when both said dilatable portions are undilated and being dilated and overlapping with a corresponding portion of the covering received within the opening in the inner member to extend the inner member along the covering beyond the terminus of the covering.

7. A unitary housing of resilient material for use in a waterproof electrical connector element capable of being assembled in the field at the terminus of a high voltage cable, the cable having an electrical conductor and a covering of insulating material with a portion of the insulating material removed to establish a terminus thereof and expose the conductor, and the connector element having an electrical contact electrically connected and mechanically secured to the exposed conductor, said housing including:

an outer sleeve-like member of resilient insulating elastomeric material having a given length with an axially extending opening therein and including a resiliently dilatable portion adjacent one end thereof, said dilatable portion having an internal diameter less than the external diameter of a corresponding portion of the covering to be received in the opening and being dilatable for overlapping with said corresponding portion in watertight relationship therewith; and an inner sleeve-like member of resilient electrically conductive elastomeric material disposed within the outer member, having an axial length less than the length of the outer member and being joined with the outer member in position to surround at least a portion of the contact when the housing is in assembled position within the connector element, said inner member terminating at one end displaced axially from said one end of the outer member and including an axially extending opening aligned with the opening in the outer member and having a first portion for cooperating with the contact and including an inside diameter complementary to a corresponding outside diameter of the contact portion with the inner member electrically connected with the contact such that the voltage gradient between the contact and the inner member is reduced to a minimum when the connector element is assembled;

said outer member being provided with a further portion adjacent the opposite end thereof for cooperatively engaging a corresponding portion of a corresponding housing in a complementary connector element in detachable watertight relationship therewith to establish a waterseal and the inner member being provided with a surface extending generally radially adjacent a portion of said opposite end of the housing from the opening in the inner member to the further portion of the outer member for reducing to a minimum the voltage gradient along said surface and a corresponding surface of the complementary connector element from the contact to the waterseal when the connector element is itself assembled and engaged with the complementary connector element.

8. The unitary housing of claim 7 wherein the inner member has a second portion extending axially along the opening therein from said one end of the inner member toward a first portion thereof, said second portion being contiguous with the resiliently dilatable portion of the outer member and being resiliently dilatable, said second portion having an internal diameter equal to the internal diameter of the resiliently dilatable portion of the outer member and being dilatable for overlapping with a corresponding portion of the covering to be received within the opening in the inner member to extend the inner member along the covering beyond the terminus of the covering when the connector element is assembled.

9. A unitary housing of resilient material for use in a waterproof electrical connector element capable of being assembled in the field at the terminus of a high voltage cable, the cable having an electrical conductor and a covering of insulating material with a portion of the insulating material removed to establish a terminus thereof and expose the conductor, and the connector element having an electrical contact electrically connected and mechanically secured to the exposed conductor, said housing including:

an outer sleeve-like member of resilient insulating elastomeric material having a given length with an axially extending opening therein and including a resiliently dilatable portion adjacent one end thereof, said dilatable portion having an internal diameter less than the external diameter of a corresponding portion of the covering to be received in the opening and being dilatable for overlapping with said corresponding portion in watertight relationship therewith; and an inner sleeve-like member of resilient electrically conductive elastomeric material disposed within the outer member and having an axial length less than the length of the outer member and being joined with the outer member in position to surround at least a portion of the contact and the exposed conductor when the housing is in assembled position within the connector element, said inner member terminating at one end displaced axially from said one end of the outer member and including an axially extending opening aligned with the opening in the outer member and having initial portions for cooperating with complementary portions of the contact with the inner member electrically connected with the contact such that the voltage gradient between the contact and the inner member is reduced to a minimum when the connector element is assembled, the inner member having a further portion extending axially along the opening therein from said one end of the inner member toward said initial portions thereof, said further portion being contiguous with the resiliently dilatable portion of the outer member and being resiliently dilatable, said further portion having an internal diameter equal to the internal diameter of the resiliently dilatable portion of the outer member and being dilatable for overlapping with a corresponding portion of the covering to be received within the opening in the inner member to extend the inner member along the covering beyond the terminus of the covering when the connector element is assembled.

References Cited

UNITED STATES PATENTS

| | | | |
|---|---|---|---|
| 2,379,942 | 7/1945 | Webber | 339—60 |
| 3,148,011 | 9/1964 | Brown | 339—218 |

FRANCIS K. ZUGEL, *Primary Examiner.*

MARVIN A. CHAMPION, *Examiner.*

J. H. McGLYNN, *Assistant Examiner.*